United States Patent
Reding et al.

(10) Patent No.: US 7,742,979 B2
(45) Date of Patent: *Jun. 22, 2010

(54) SYSTEM AND METHOD FOR AUTOMATED COMMODITIES TRANSACTIONS INCLUDING AN AUTOMATIC HEDGING FUNCTION

(75) Inventors: Gary Reding, Minnetonka, MN (US); Kent Beadle, Hudson, WI (US); Chris Nikkel, South Minneapolis, MN (US); Mark Schulze, Edina, MN (US); Walker Humphries, Edina, MN (US); Dave Womeldorf, Lakeville, MN (US); David Clark, Cambridge, MA (US); Scott Cerreta, Farmingham, MA (US); Carl Ozkaynak, Quincy, MA (US); Julia A. Granada Rodriguez, Waltham, MA (US)

(73) Assignee: Farms Technology, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/134,833

(22) Filed: Jun. 6, 2008

(65) Prior Publication Data

US 2008/0301034 A1 Dec. 4, 2008

Related U.S. Application Data

(63) Continuation of application No. 10/870,112, filed on Jun. 17, 2004, now Pat. No. 7,418,423, which is a continuation of application No. 09/835,088, filed on Apr. 13, 2001, now abandoned.

(60) Provisional application No. 60/241,543, filed on Oct. 18, 2000.

(51) Int. Cl.
    G06Q 40/00 (2006.01)
(52) U.S. Cl. ...................................................... 705/37
(58) Field of Classification Search .................. 705/26, 705/36 R, 37
    See application file for complete search history.

(56) References Cited

U.S. PATENT DOCUMENTS 4,674,044 A   6/1987   Kalmus et al.

(Continued)

FOREIGN PATENT DOCUMENTS

JP    411232354    8/1999

(Continued)

OTHER PUBLICATIONS

Ins and Outs of Program Trading, and Why It's Being Blamed for Market Collapse; [Orange County Edition] Los Angeles Times (pre-1997 Fulltext). Los Angeles, Calif.: Dec 6, 1987. p. 14.*

(Continued)

*Primary Examiner*—Stefanos Karmis
*Assistant Examiner*—Thuan Tran
(74) *Attorney, Agent, or Firm*—Grady L. White, Esq.; Law Offices of Grady L. White, LLC (57) ABSTRACT

An integrated virtual market is provided that facilitates communication between the producers of a given commodity and the parties wishing to purchase such commodities. This system provides real-time updated information about local pricing being offered by those purchasers. In addition, those producers can post offers that can automatically be accepted by purchasers and have contracts automatically generated. An important consideration from a purchaser's prospective is minimizing the risk associated with making such transactions. Due to this, futures contracts are often obtained. The virtual market system of the present inventions automatically requests and obtains futures contracts to hedge the contracts being generated.

38 Claims, 4 Drawing Sheets

U.S. PATENT DOCUMENTS

| | | |
|---|---|---|
| 4,677,552 A | 6/1987 | Sibley, Jr. |
| 4,903,201 A | 2/1990 | Wagner |
| 5,063,507 A * | 11/1991 | Lindsey et al. ................ 705/26 |
| 5,077,665 A | 12/1991 | Silverman et al. |
| 5,136,501 A | 8/1992 | Silverman et al. |
| 5,285,383 A | 2/1994 | Lindsey et al. |
| 5,297,031 A | 3/1994 | Gutterman et al. |
| 5,706,442 A | 1/1998 | Anderson et al. |
| 5,715,402 A | 2/1998 | Popolo |
| 5,727,165 A | 3/1998 | Ordish et al. |
| 5,732,400 A | 3/1998 | Mandler et al. |
| 5,775,734 A | 7/1998 | George, Jr. |
| 5,787,156 A | 7/1998 | Katz |
| 5,794,207 A | 8/1998 | Walker et al. |
| 5,845,266 A | 12/1998 | Lupien et al. |
| 5,873,071 A | 2/1999 | Ferstenberg et al. |
| 5,884,286 A | 3/1999 | Daughtery, III |
| 5,924,082 A | 7/1999 | Silverman et al. |
| 5,930,767 A | 7/1999 | Reber et al. |
| 5,960,411 A | 9/1999 | Hartman et al. |
| 5,970,479 A | 10/1999 | Shepherd |
| 6,014,643 A | 1/2000 | Minton |
| 6,058,379 A | 5/2000 | Odom et al. |
| 6,131,087 A | 10/2000 | Luke et al. |
| 6,242,474 B1 | 8/2001 | Garcia |
| 6,317,728 B1 | 11/2001 | Kane |
| 6,338,050 B1 | 1/2002 | Conklin et al. |
| 6,393,406 B1 | 5/2002 | Eder |
| 6,401,041 B1 | 5/2002 | Peterson |
| 6,418,419 B1 | 7/2002 | Nieboer et al. |
| 6,584,451 B1 | 6/2003 | Shoham et al. |
| 6,598,027 B1 | 7/2003 | Breen et al. |
| 6,622,129 B1 | 9/2003 | Whitworth |
| 6,673,479 B2 | 1/2004 | McArthur et al. |
| 6,390,472 B1 | 5/2005 | Vinarsky |
| 6,988,083 B2 | 1/2006 | Dines et al. |
| 7,076,452 B2 | 7/2006 | Florence et al. |
| 7,318,045 B2 | 1/2008 | Baecker et al. |
| 7,349,879 B2 | 3/2008 | Alsberg et al. |
| 2001/0032165 A1 | 10/2001 | Friend et al. |
| 2001/0034663 A1 | 10/2001 | Teveler et al. |
| 2002/0025330 A1 | 1/2002 | May |
| 2002/0023038 A1 | 2/2002 | Fritsch et al. |
| 2002/0023039 A1 | 2/2002 | Fritsch et al. |
| 2002/0059091 A1 | 5/2002 | Hay et al. |
| 2002/0065765 A1 | 5/2002 | Shuler et al. |
| 2002/0095369 A1 | 7/2002 | Kaplan et al. |
| 2002/0138393 A1 | 9/2002 | Tatge |
| 2002/0194115 A1 | 12/2002 | Nordicht et al. |
| 2003/0195822 A1 | 10/2003 | Tatge |
| 2004/0024648 A1 | 2/2004 | Tatge |
| 2005/0114252 A1 | 5/2005 | Beurskens |
| 2006/0259417 A1 | 11/2006 | Marynowski et al. |

FOREIGN PATENT DOCUMENTS

| | | |
|---|---|---|
| WO | WO0157752 | 8/2001 |

OTHER PUBLICATIONS

Marvin L. Hayenga and Lee F. Schrader. Formula Pricing in Five Commodity Marketing Systems. American Journal of Agricultural Economics, vol. 62, No. 4 (Nov. 1980), pp. 753-759.*

Daniels Trading Glossary.

North Carolina Soybean and Corn Prices with Basis 1980-2003.

www.usafutures.com, dated Jan. 25, 1999.

www.foodmarketexchange.com, dated Jun. 20, 2000.

"Grain Price Hedging Basics", dated Oct. 1995.

"Ins and Outs of Program Trading, and Why It's Being Blamed for Market Collapse," Los Angeles Times, Dec. 6, 1987, Los Angeles, California.

Philip Crawford, "The New High-Tech Investing: Computer as Fund Manager," International Herald Tribune, Feb. 1, 1992, New York, New York.

Barbara Lindemann Schlei, "Electronic Trading of Agricultural Products," Commonwealth Club, Jul. 8, 1980, pp. 1-22, San Francisco, California.

* cited by examiner

SYSTEM AND METHOD FOR AUTOMATED COMMODITIES TRANSACTIONS INCLUDING AN AUTOMATIC HEDGING FUNCTION

1. CROSS REFERENCE TO RELATED APPLICATIONS

This application is a continuation of application Ser. No. 10/870,112, filed Jun. 17, 2004, which is a continuation of application Ser. No. 09/835,088, filed on Apr. 13, 2001, entitled System And Method For Automated Commodities Transactions Including An Automatic Hedging Function, which claims the benefit of U.S. Provisional Application No. 60/241,543, filed Oct. 18, 2000, which are all hereby incorporated herein in their entirety by reference.

2. FIELD OF THE INVENTION

The present invention relates generally to commodities transactions. More particularly, the present invention relates to a system for allowing automated commodities transactions to occur within limits defined by the relevant participants.

3. GENERAL BACKGROUND AND STATE OF THE ART

Agricultural commodities are a basic element of our economy and their exchange through transactional markets has been well established. In short, the process is extremely simple at a high level. Producers grow the various agricultural products and sell them to consumers at the best price they are able to obtain. Thus, the success of the producer depends on the price offered by the consumer and the quantities produced and ultimately sold. In practice, however, there is an extremely complex set of transactions that can actually occur in order to achieve this rather simple result.

Generally, the producers will sell and deliver their products to local intermediaries, such as elevator operators. The elevator operators then sell and deliver those products to end users/consumers (or to yet another middleman) who may be located anywhere. The elevator operator must generate a profit by selling the products at a higher price than paid to the producer, while taking into account the costs for storage and transportation. The producer realizes a profit when the products are sold to the intermediary at a price that is higher than the cost of production and transportation. One of the major considerations in these commodities transactions is that the margins are very low.

The prices for the commodities are not static and in fact can fluctuate dramatically based on any number of factors and issues. Centralized commodities exchanges have been established that allow for regulated transactions under these fluctuating conditions to occur. Through this system, the price of commodities is determinable, both at the present time and at least speculatively into the future. For example, the Chicago Board of Trade (CBOT) is such a commodities exchange and the prices indicated by that board become the de facto price of a given commodity world-wide. More accurately, the price indicated by CBOT serves as a base by which prices in given localities are determined. As an example, assume that a bushel of yellow corn is trading on CBOT for $2.00. That means, that a bushel of yellow corn delivered to Chicago, Ill. (during the specified time period that the price is good for) is worth $2.00.

Thus, if a producer can deliver his product to the Chicago area, that producer should receive the price for the commodity indicated by CBOT. In practice, this usually is not feasible. A farmer in Kansas who raises corn is usually not in a position to economically transport that corn to Chicago in quantities to make it worthwhile. Thus, the farmer delivers his corn to a local elevator operator and sells it there. The elevator operator is usually going to pay the farmer an amount that is based on the CBOT price. The price paid will depend on geographical location, transportation availability and cost, storage costs, etc.

To determine the amount paid to the local farmer, the elevator operator adds a basis price to the CBOT trading price. The basis includes the elevator's costs, such as transportation to market and costs associated with running the facilities, as well as the margin. For example, assuming transportation charges of $0.40/bushel and a margin of $0.04, the local farmer will be paid $1.56/bushel for yellow corn, when the CBOT trading price is $2.00/bushel ($2.00-$0.40-$0.04=$1.56). In this example, the elevator operator will realize a profit of $0.04/bushel when the corn is resold at the anticipated price.

This is obviously a very narrow margin for the elevator operator and this translates into a high degree of risk. Risk is incurred because delivery of the material is usually scheduled for some time after the agreement is completed. If at the time of delivery, the CBOT price has dropped the elevator operator is still obligated to pay the producer the amount agreed on. However, it will be difficult if not impossible for the elevator operator to resell the product at a price high enough to obtain his desired margin. In the above example, the margin was only $0.04. A minor shift in the commodities market can financially devastate the elevator operator.

To manage that risk, the elevator operator takes advantage of another element of the commodities exchange. For every contract that is generated with a producer, the elevator operator will place a hedge order. In the case of a cash purchase with a producer, a sell order would go into the commodities futures market. Continuing with the above example, assume that a producer wishes to sell to the elevator operator 500 bushels of yellow corn for delivery 3 month from today. Yellow corn is at $2.00/bushel at CBOT and the elevator operator agrees to pay the producer $1.56/bushel for delivery in three months. To cover his risk the elevator operator also works through a broker to sell 500 bushels of yellow corn in the futures market. The futures contract is for 500 bushels of yellow corn, deliverable in three months at a price of $2.00/bushel. If in three months when the elevator operator takes delivery from the producer, the trading price of yellow corn is down, the futures contract will prevent the elevator operator from realizing a loss. One way of looking at this is to assume that the elevator operator were to try and sell that corn on the market. Any potential buyer would look at the CBOT trading price, which is now below the $2.00 level and only be willing to pay a reduced amount. However, the elevator operator has the futures contract for a sale at the price of $2.00/bushel. Thus, the margin of $0.04 is maintained. Conversely, if the trading price goes up, purchasers will be willing to give the elevator operator an amount exceeding $2.00 a bushel, but the elevator operator still must fulfill his future contract to sell at $2.00.

Thus, the futures markets serves as a hedging tool to minimize risk for the various intermediaries, such as the elevator operators. As a practical matter, these various futures contracts are usually unwound in various ways without requiring actual delivery of the commodity. Therefore, it provides a truly advantageous function to the intermediary.

All of this simply lays a groundwork for commodities exchanges on the local level. The elevator operator negotiates with a local producer on price. When a tentative agreement is reached, the elevator operator tries to sell a futures contract to minimize risk. If an acceptable futures contract is obtained, the elevator operator then formally agrees to accept the contract with the producer. In effect, two contracts are negotiated and ratified for the sale of a commodity from a producer to an elevator operator.

As discussed above, the producer will have various subjective and objective incentives to deal with certain elevator operators. One obvious consideration is the proximity of the elevator to the producer. Past dealings with a given elevator operator would be another consideration. Whatever the reasons may be, a given producer will have several elevator operators that they might choose to deal with. At a given time, the producer will decide to sell a quantity of a product. The producer must call these various operators to determine what they will be paying. When an elevator operator receives such a call, he must then call a broker on the CBOT to determine what the current trading price of the commodity is. Then the elevator operator subtracts his basis to determine a flat price. Assuming that elevator is capable of handling it, the elevator operator makes an offer to buy a specified quantity of the commodity and a contract is ratified. The operator then secures a futures contract for the appropriate amount with another phone call to a broker. Of course, after hearing the flat price offered, the producer may refuse to proceed or attempt to renegotiate. In the later case, more calls to the broker may be necessary to determine if the required futures contracts can be obtained.

This process is slow and tedious when it works, but at times it is completely incapable of functioning. The elevator operators may be unavailable when the producers call or unable to immediately track down the required information. The commodities exchanges are only available during certain hours, thus further limiting the process. Even when the exchanges are open, securing quotes and placing orders by telephone is often a delayed process. In short, this can be drawn out process and fails to realize a high degree of efficiency.

Therefore, there exists a need to provide an automated service that allows for interaction between producers and intermediaries that can obtain and display real-time relevant data and allow for the required hedging activities to occur at any time, while facilitating the completion of commodities transactions.

4. INVENTION SUMMARY

The present invention provides a platform by which producers and intermediaries can provide and obtain information related to the selling of commodities on a local level, as well as coordinating and facilitating the closing of the desired contracts.

The present invention establishes an electronic marketplace that interconnects the producers with the elevator operator, and the elevator operators with the commodities exchanges. This global marketplace allows for individual elevator operators to provide customized local information so that the relevant producers can conveniently determine pricing and availability in their areas. Producers can then negotiate with those selected elevator operators. The system provides for an automatic hedging function, wherein it is assumed that any given elevator operator will require an appropriate futures contract before agreeing to a contract with a producer. Thus, the system initiates contact with the commodities exchange, determines the availability of the desired futures contract, and if available, secures the contract for the elevator operator. Thus, one significant leg of the negotiation process is reduced in complexity.

The system can also represent the elevator operator in transactions with the producers without requiring oversight by the elevator operator. Each elevator operator that participates is given control over a portion of the system representing them. The elevator operator is then able to post predefined bids for specified products, regardless of the fluctuations of the commodities prices that will inevitably occur. Over a reasonable period of time, the elevator operator's basis will remain constant or at the very least it will be a known factor. In addition, the elevator operator will certainly know what volume of trading he would like to engage in. These factors are entered by the elevator operator into his portion of the system. The system will then repeatedly obtain the prices posted on the relevant commodities exchange and determine for each elevator operator on the system their own unique flat price. This flat price, which changes in real time in accordance with the commodities exchange is then made available to the local producers. In addition, the amount the elevator operators need during any given time period are also posted.

Once the elevator operator posts his information to his portion of the system, transactions can occur without further input from the elevator operator. For example, assume the same values discussed in the above example. The elevator operator's basis is −$0.44 for a given period of time. A producer accesses the system and views this operator's data. The current CBOT price is $2.00/bushel so the displayed flat price is $1.56/bushel. More specifically, this elevator operator is essentially posting a bid to buy yellow corn in his locality (i.e., delivered to him) for $1.56 bushel. There may be some limit imposed for both time and quantity. For example, this elevator operator may want to receive 1500 bushels, for delivery in three months time. A further limit would be that each producer can only deliver a given minimum or maximum.

Assuming this price is satisfactory to the producer, he can post a response to the bid. He may indicate that he will deliver 500 bushels of yellow corn in three months time. At this point, the system connects with the commodities exchange and attempts to obtain a futures contract to sell 500 bushels of yellow corn at $2.00/bushel. The producer is then informed that a successful contract has been generated. The elevator operator's posted information is then modified. That is, the amount still desired is appropriately reduced.

The above transaction can occur without any human intervention on the part of the elevator operator or the commodities exchange. Once the elevator operator has given the relevant information, the system can perform the necessary functions without subsequent intervention. In addition, there are automated portions of the commodities exchange that allow for after-hours trading. Of course, the system can allow human interaction at any point.

6. DETAILED DESCRIPTION OF THE PREFERRED EMBODIMENTS

Figure 1:
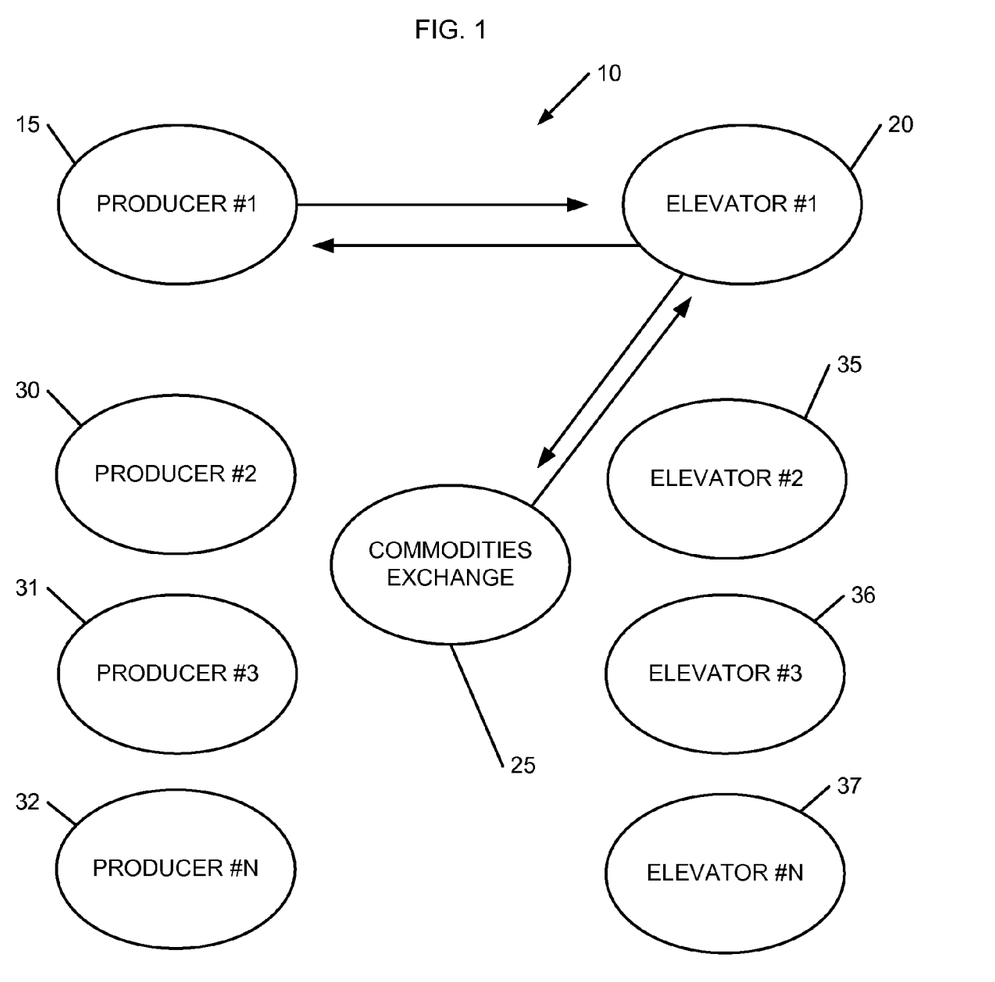
FIG. 1 is a schematic diagram illustrating a transaction protocol for local commodities exchanges.

FIG. 1 illustrates a local commodities transaction system and is generally referred to as 10. A first commodities producer 15 has a predetermined quantity of the particular commodity that is or will be available for delivery at some known date. First producer 15 may either have a volume of commodity in his possession or may be anticipating the fruition of a current or future crop. It is goal of first producer 15 to sell that commodity at the highest price obtainable within his local market structure, taking into account the cost for storing the commodity if he is unable to sell or deliver that product for some period of time, and also taking into account the cost of transportation to get the product to whomever ultimately buys it from first producer 15.

First elevator operator 20 is in a position to buy commodities from local producers. First elevator operator 20 will usually have the ability to store large volumes of any given commodity for predetermined periods of time and is also in a position to coordinate the delivery of those commodities from his own site to that of other parties. It is usually the goal of first elevator operator 20 to obtain as much of the commodity as can be resold so long as that resale price generates a sufficient profit. As previously explained, the pricing of the commodity will ultimately be determined by some central commodity exchange 25. For example, commodity exchange 25 may be the Chicago Board of Trade. By knowing what the localized cost for storage and transportation are and knowing what margin or profit is required, first elevator operator 20 can generate a local price that he is willing to pay for commodities delivered to him based upon a current price indicated by the commodities exchange 25. The price first elevator operator 20 is willing to pay is that operator's flat price, and in most cases will be somewhat less than that proffered by the commodities exchange 25. Before first elevator operator 25 will engage in any transaction with a local producer, he most likely will attempt to secure a futures contract which will serve a hedging function that will minimize the risk for first elevator operator 20.

FIG. 1 illustrates a typical scenario that could be found in any given locality. There could be any number of local producers 15, 30, 31 and 32 as well as any number of elevator operators 20, 35, 36 and 37. It is assumed that in this locality any one of these producers 15, 30, 31 and 32 would be willing to do business with any one of these elevator operators 20, 35, 36 and 37. The factors that a given producer will consider when deciding on which elevator operator to deal with can vary greatly, but usually will include past business dealings, capacity and proximity. Ultimately, any given producer will have a number of elevators that they are willing to deal with, thus the determining factor becomes what price each of those individual operators will be willing to offer. It is important to realize that each individual elevator operator will determine the price that they are willing to pay independently of any other given elevator operator.

Thus, what is represented in FIG. 1 are the actions required for first producer 15 to negotiate and secure a contract with first elevator operator 20. Initially, first producer 15 initiates contact with first elevator operator 20; usually via telephone. First producer 15 indicates that he has a certain quantity of a commodity that will be available for delivery. First elevator operator 20 determines whether or not he needs that quantity or a lesser quantity of that commodity delivered along the specified time line. Assuming that he does, first producer 15 and first elevator operator 20 will negotiate a tentative price. This price will often be based on recent historical pricing obtained from commodities exchange 25 at some previous point in time. Alternatively, no tentative price is discussed at all and first producer 15 and first elevator operator 20 proceed simply on the basis that first elevator operator 20 will have the capacity and the desire to obtain the commodity if acceptable pricing can be determined. At that point, first elevator operator 20 initiates contact with a futures commission merchant (FCM) associated with the commodities exchange 25. The futures commission merchant will then inform first elevator operator 20 of the current price for the commodity in question.

First elevator operator 20 will then re-contact first producer 15 and offer a flat price based on the price obtained from the commodities exchange 25. There may be some negotiation that occurs, but first producer 15 will either accept or reject the flat price that is being offered by first elevator operator 20. One reason to reject the price offered is that first producer 15 may wish to contact the remainder of the local elevators 35, 36 and 37 that he is willing to do business with in order to determine which price they will be offering. Assuming, however, that first producer 15 is going to accept the flat price offered by first elevator operator 20, he will indicate this to first elevator operator 20. At that point, first elevator operator 20 will re-contact the futures commission merchant associated with commodities exchange 25 and attempt to sell a futures contract for the same amount of the same commodity that he is planning on buying from first producer 15 at the same commodities exchange price that his flat price was determined from for the same date that delivery will be expected from first producer 15.

It may, in fact, not be possible to obtain such a futures contract. If that is the case, first elevator operator 20 may indicate to first producer 15 that they do not have a deal. At that point, they can either terminate the negotiation or continue to renegotiate the terms. Conversely, first elevator operator 20 may be able to secure such a futures contract and will subsequently contact first producer 15 to finalize the agreement.

At some time in the future, first producer 15 will deliver the pre-determined amount of the commodity to first elevator operator 20. At that point in time, the price indicated by the commodity exchange 25 for that commodity may have increased, decreased or remained the same. Assuming it has remained the same, elevator operator 20 generates a profit by realizing a gain of the margin that went into the determination of the flat price when first elevator operator 20 resells the commodity to another party. If the price indicated by commodities exchange 25 has decreased, elevator operator 20 will not realize his margin on a subsequent resell, but will realize that margin when his futures contract is unwound.

What has been described thus far is a complicated series of transactions that will usually occur between the first producer 15, first elevator operator 20 and a representative of commodities exchange 25 in order for a single transaction to occur. When it works well, this is a slow and tedious process. There are, however, a number of factors which can prevent this process from working, even at that level. For example, first elevator operator 20 may not be available for negotiations when first producer 15 initiates contact. Similarly commodities exchange 25 may not be open for business during the time period within which first producer 15 and first elevator operator 20 are negotiating. Thus, substantial delays can be imposed. This process is seriously hampered when one considers the number of elevators and number of producers that must work together at any given locality.

Figure 2:
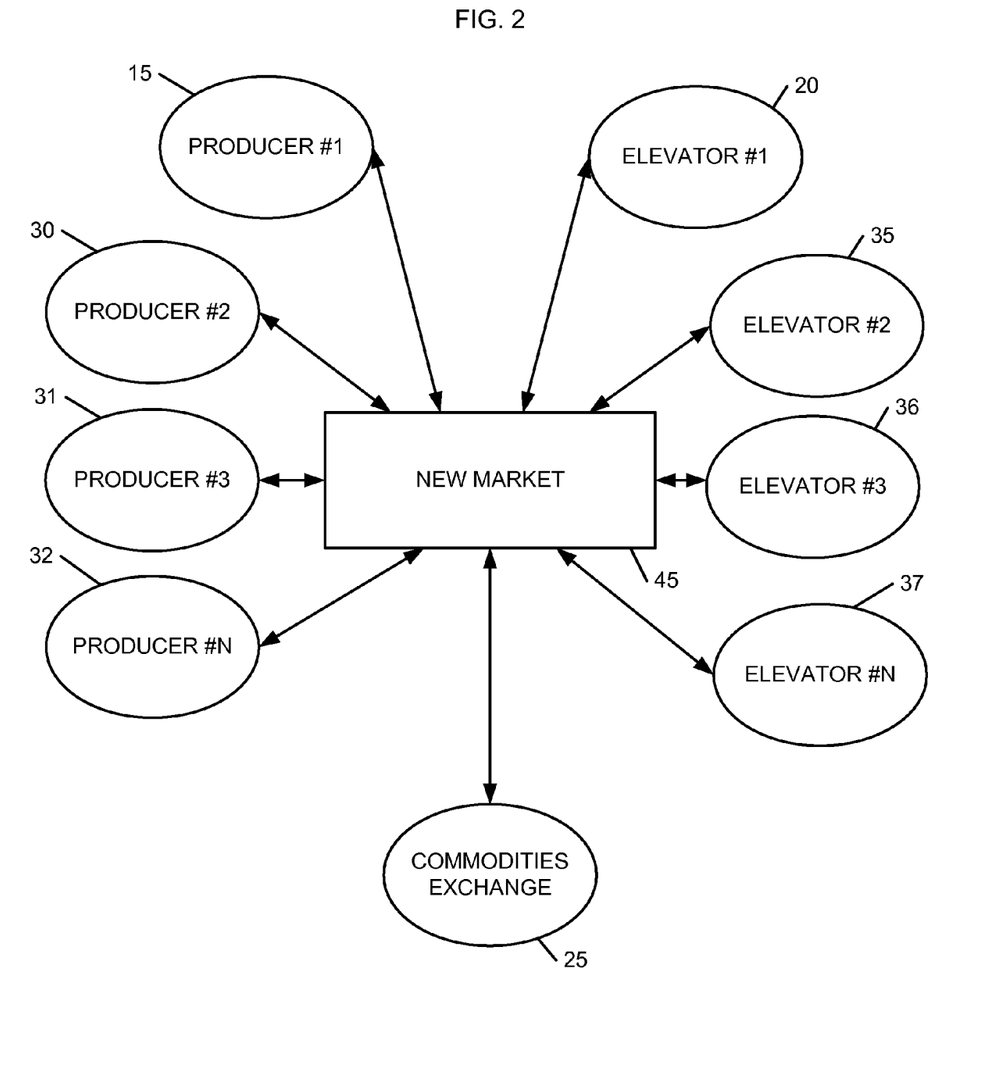
FIG. 2 is a schematic diagram illustrating the transaction protocol for local commodities exchanges utilizing the teachings of the present invention.

Referring to FIG. 2, the virtual exchange 45 of the present invention is illustrated. Through this system, producers 15, 30, 31 and 32 are brought together with elevator operators 20, 35, 36 and 37. Likewise, those elevator operators are also able to communicate with the commodities exchange 25. Central to all of these transactions is the Net Market (FHNM) 45. Net Market 45 is a global electronic marketplace within which each individual elevator operator 20, 35, 36 and 37 is provided with their own representative customized exchange display. For example, first elevator operator 20 manages a small portion of Net Market 45 within which first elevator operator's 20 parameters and requirements are displayed. This can include posts requesting desired amounts of commodities delivered in specified periods of time. Pricing parameters are input into the Net Market 45 by first elevator operator 20. Net Market 45 communicates with commodities exchange 25 on a real-time basis. From the data obtained, relevant flat prices for each individual elevator operator are determined by modifying the realtime data obtained from commodities exchange 25 based on the individual parameters provided by the respective elevator operators. Thus, any given producer can access Net Market 45 and obtain information about any desired or relevant elevator operator. Net Market 45 can also facilitate the generation and completion of a contract between a given producer and a given elevator operator, while also automatically hedging that contract for the elevator operator on the commodities exchange 25.

Figure 3:
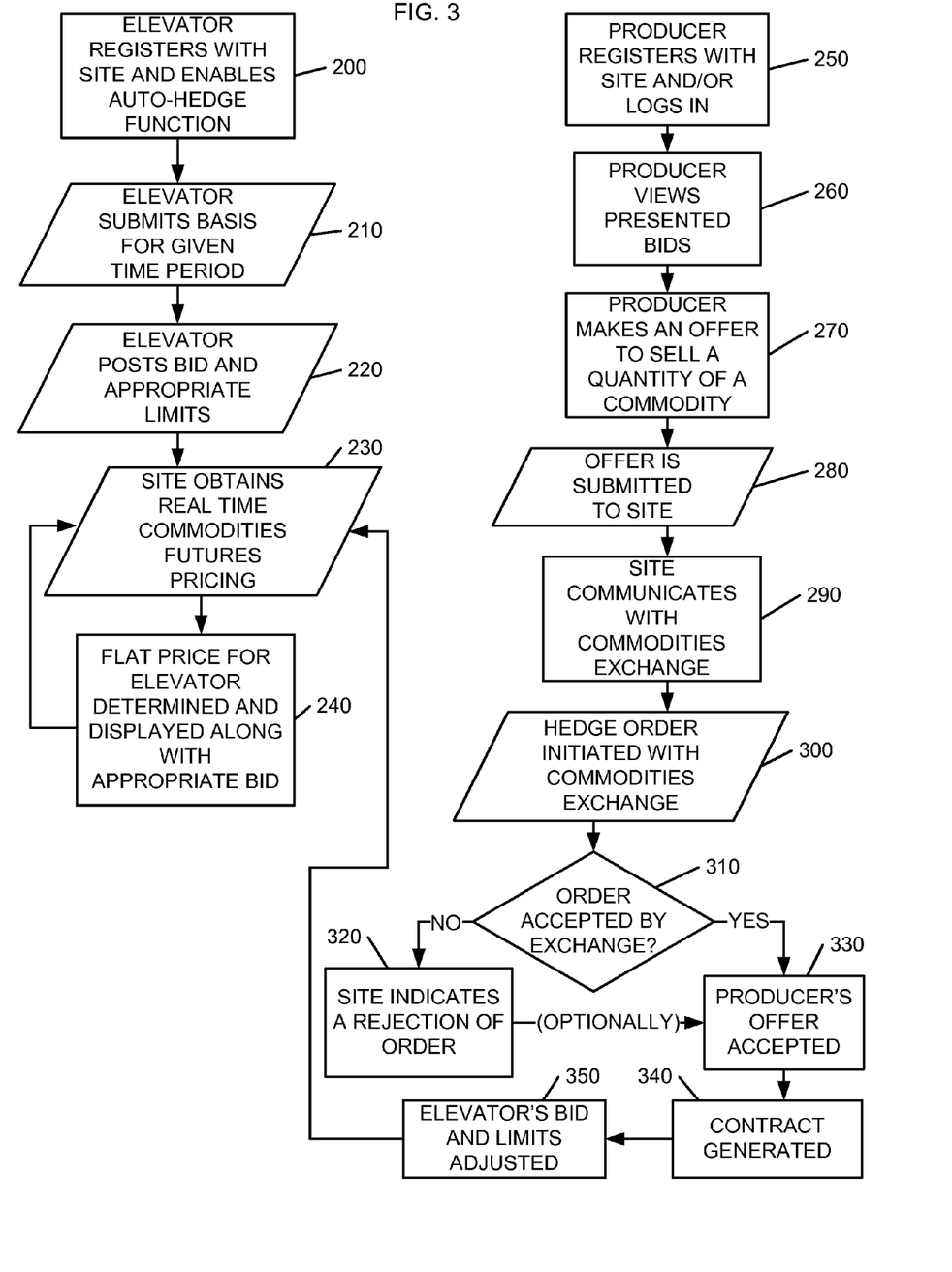
FIG. 3 is a flowchart of the illustrating the sequence of events involved in a local commodities transaction according to the teachings of the present invention.
Figure 4:
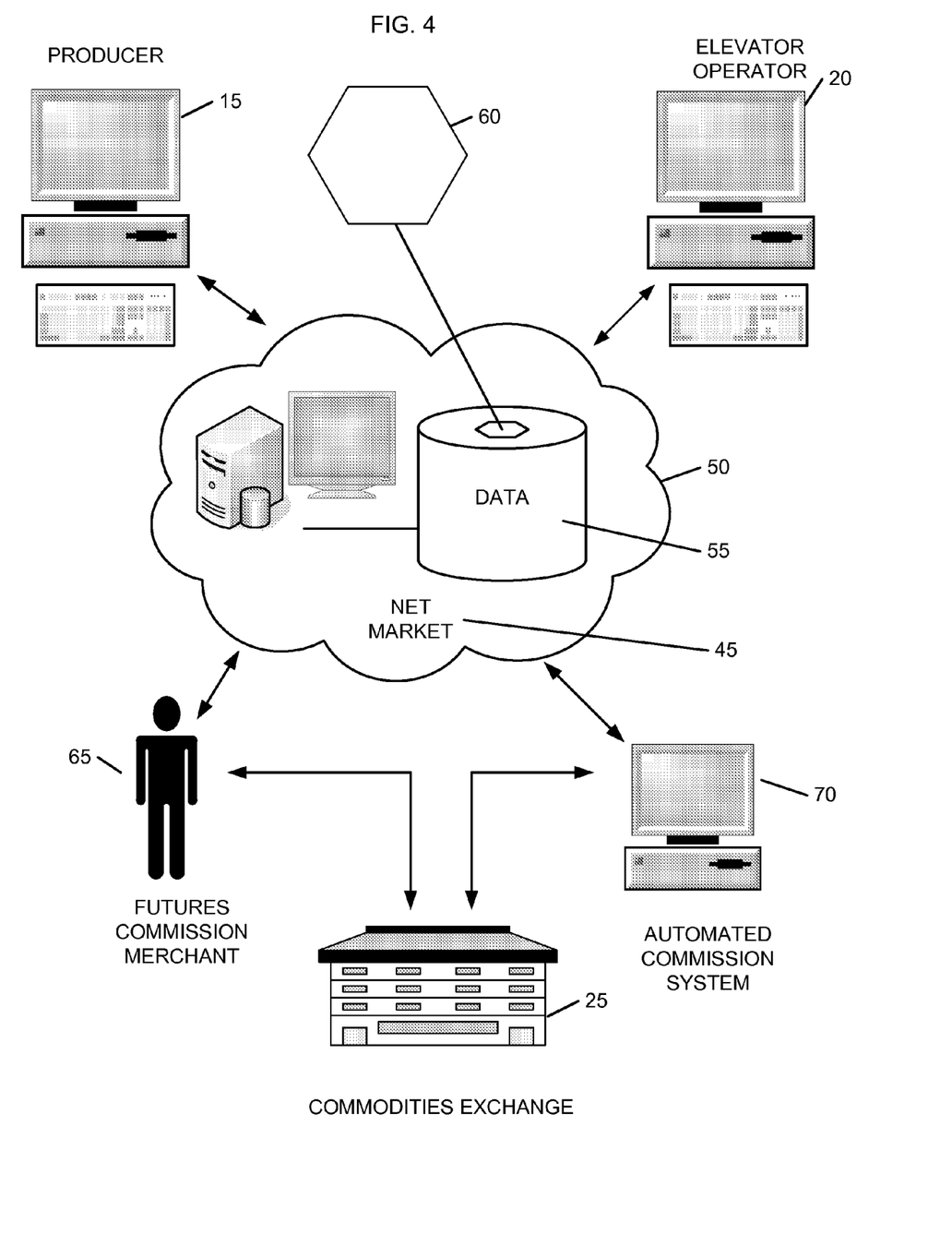
FIG. 4 is a schematic diagram illustrating the system of the present invention.

Referring to FIGS. 3 and 4 the present invention will be described in greater detail. In general, the present system relies on electronic communication between the parties. Various communicative acts and resulting actions that take place can either be generated or initiated by the parties themselves, or in many cases may be automated. The level of automation, if any, will be dictated by the parties themselves. It is contemplated that the present invention will be carried out using electronic devices interconnected through a computer network or other communication mediums.

In one embodiment, such communication occurs over the Internet, represented generally as 50. In general, transactions on the Internet will occur between a client terminal and a server and will often utilize the hypertext transfer protocol (HTTP). This protocol permits client systems connected to the Internet to access independent and geographically scattered server systems also connected to the Internet. Client side browsers, such as Netscape's Navigator and Microsoft's Internet Explorer provide efficient graphical user interface based client applications that implement the client side portion of the HTTP protocol. Server side application programs, generically referred to as HTTPd servers, implement the server side portion of the HTTP protocol. HTTP server applications are widely available.

The distributed system of communication and information transfer made possible by the HTTP protocol is commonly known as the World Wide Web (WWW) or as simply "the Web." From a client side user interface perspective, a system of uniform resource locators (URLs) is used to direct the operation of a web browser in establishing transactional communication sessions with designated web server computer systems.

In use, a client computer system will seek to access to a particular document or web page located on the server system. A generally closed hypertext transfer protocol transaction is conducted between a client browser application executing on the client system and an HTTP'd server application executing on the server system. A web page is served by the server system to the client. Subsequent actions can occur by the client selecting additional URL's that may be embedded within the delivered page. In addition, specific information can be requested by the server system and the client system can provide that information so that responsive communication can occur.

As one alternative, the client may be allowed to access the server system and login as a participant in an active session. The present invention only requires that the various parties are capable of electronic communication.

Net Market 45 is an HTTP server system capable of storing data and transmitting that data across the Internet once so requested. It is to be understood that a server system can include a single server or a plurality of servers working together to achieve the desired result. Furthermore, the server system is meant to include both the hardware and the software necessary to make the system function as described. Producer 15 and elevator operator 20 each use client terminals which may be embodied in personal computers or hand held electronic devices that are capable of communication with Net Market 45 via internet 50. Database 55 is associated with Net Market 45. Within database 55, each individual elevator operator 20 has a portion allocated to that elevator operator. This apportioned data segment is an exchange structure referred to as customer exchange 60. Elevator operator 20 is able to access and customize customer exchange 60, so that the individual attributes selected by elevator operator 20 are displayable through customer exchange 60 when requested by a given producer 15. In one context, customer exchange 60 will be a web page or a portion of a web page obtainable through an Internet web site managed and controlled by Net Market 45. That is, producer 15 can issue a request through Internet 50 to the server associated with Net Market 45 requesting the relevant web site. Once obtained, information indicative of elevator operator 20 will be presented in an appropriate format. Producer 15 can then request the specific page or portion of a page dedicated to customer exchange 60 associated with elevator operator 20 and this information will be transmitted to producer 15 from Net Market 45. Of course, if the appropriate URL or other addressing information is known, producer 15 can directly request the specific customer exchange 60. In either event, producer 15 is able to obtain information from Net Market 45 that is particular and specific to elevator operator 20 and is in fact, at least partially controlled by elevator operator 20.

The purpose of providing such information to producer 15 is to two fold. First, it simply provides information to producer 15 that is helpful in making business decisions. In addition, the present system is able to facilitate orders and contracts between producer 15 and elevator operator 20. Reference is made to the flow chart of FIG. 3 as well as the schematic illustration of FIG. 4 to explain the process in greater detail. At step 200, elevator operator 20 initiates contact with and registers with Net Market 45. A certain amount of basic information is provided to Net Market 45 about elevator operator's 20 business; contact, address and billing information would typically be requested and provided. While not specifically required, any information that would help a given producer 15 evaluate a given elevator operator 20, can be selectively requested and/or provided for display through customer exchange 60. Such registration will usually only be required upon elevator operator's 20 initial visit. Elevator operator 20 also provides information related to which crops or commodities that elevator operator 20 is interested in obtaining. At step 210, elevator operator 20 will submit a basis and a corresponding futures month for a given commodity for a given period of time. As previously explained, the basis is a differential between the price the commodity is trading at on a commodities exchange, and the flat price that will ultimately be offered to the producer 15. The basis will consist of the margin or profit the elevator operator expects to receive, as well as the anticipated costs associated with marketing and transporting the product.

At step 220, elevator operator 20 will post bids on Net Market 45 that are to be presented in customer exchange 60. Once again, customer exchange 60 is a web page or a portion of a page that is specific to elevator operator 20. For example, such bids will include the quantity of a given commodity desired and any associated limits such as delivery times and minimum and/or maximum amounts desired. Such limits will vary and are in the given elevator operator's 20 discretion.

At step 230, Net Market 45 interacts with the commodity exchange 25 in one of two ways. Net Market 45 can communicate through a futures commission merchant 65 or through an automated commission system 70, as directed by elevator operator 20. A futures commission merchant 65 is simply a person or party licensed by the commodities exchange 25 to conduct transactions therein for parties outside of commodities exchange 25. Communication through futures commission merchant 65 can either be manual or fully automated. That is, the human operator can receive and respond to requests initiated by Net Market 45 or an automated system can be set up to handle those requests for that futures commission merchant 65. Automated communication system 70 essentially serves the same purpose as futures commission merchant 65, however, it is an automated system set up and controlled by commodities exchange 25.

A third option, not separately illustrated would be a data collection service set up and maintained to obtain information from commodities exchange 25 and to sell or otherwise provide that information to participants in the market. In any event, at step 230 Net Market 45 generates a request to receive real-time pricing information from the commodities exchange 25 regarding the various commodities that elevator operator 20 is posting bids for.

At step 240, Net Market 45 determines a flat price for the given commodity for elevator operator 20 by subtracting the basis from the real-time pricing data obtained from commodities exchange 25. This calculated flat price is then displayed via an appropriately formatted customer exchange 60 and displayed to a given producer 15 upon request.

The above was described with respect to a single elevator operator posting a bid for a single commodity. In practice, Net Market 45 manages a number of customer exchanges 60, for a number of elevator operators 20. Thus, as a matter of efficiency, Net Market 45 is constantly obtaining real-time data from commodities exchange 25 regarding the real-time pricing of any number of commodities. As this real-time pricing data varies, Net Market 45 updates the posted flat price for the various elevator operators 20, by recalculating each elevator operator's 20 flat price based on the real-time data. Thus for any producer accessing the system, a given elevator operator's 20 posted flat price will vary in near synchronicity with the real time data generated by commodities exchange 25. In fact, the producers system can be configured to repeatedly request this data so that real time updates occur. Alternatively, a request can be sent to have FHNM 45 push this data to producer 15 at a given interval to achieve the same result.

Thus, what has been achieved thus far is that elevator operator 20 has registered with the system and authorized the system to generate contracts and take certain actions on his behalf. Information specific to elevator operator's 20 business has been obtained and formatted in customer exchange 60. Thus, a given producer can access FHNM 45 and obtain information specific to elevator operator 20 or other registered elevator operators.

Returning to Step 200, elevator operator 20, must authorize Net Market 45 to conduct certain transactions for elevator operator 20. When so authorizing the system to function in this regard, elevator operator 20 can decide whether to enable an automatic hedging function of Net Market 45. As explained above, purchasing or selling a futures contract through the commodities exchange 25, minimizes the risk associated with dealing in commodities. As a practical matter, most elevator operators 20, will seek to engage this function, however, it is an option they can selectively enable or disable.

At step 250, producer 15 registers with Net Market 45. Such registration need only occur the first time producer 15 uses the system. Subsequently, producer 15 may simply log in the known way. During registration, producer 15 will provide to Net Market 45 certain data about producer 15 sufficient to allow Net Market 45 to conduct transactions between producer 15 and a given elevator operator 20. Such information may not be required if producer 15 only seeks to view data rather than actually engage in transactions.

Once registered or logged in, producer 15 will request a customer exchange 60 from one or more elevator operators 20 that producer 15 is interested in conducting business with. Displayed to the producer 15 in the returned web page or other communication format will be a posted bid for a given quantity of a given commodity, within a given time frame. For example, elevator operator 20 may post through customer exchange 60 that he would like to receive 2,000 bushels of yellow corn deliverable to his place of business three months from today's date. Currently and separately, yellow corn is trading at $2 a bushel on commodities exchange 25. Because Net Market 45 is constantly or least regularly receiving real-time data from commodities exchange 25, this value is known to Net Market 45. Previously elevator operator 20 had posted to the system that his basis would be $0.44/per bushel for yellow corn. Thus, a flat price of $1.56 per bushel is displayed on customer exchange 60. Upon viewing this information, producer 15 may decide that he would like to sell 500 bushels of yellow corn to elevator operator 20 at $1.56 per bushel deliverable in three months. This information is then transmitted from producer 15 to Net Market 45 at Step 280. Since the producer's 15 offer is within the parameters established by elevator operator 20 the system recognizes that a transaction can be facilitated and a contract could be generated.

Previously at Step 200, elevator operator 20 had enabled the automatic hedging function of Net Market 45. Thus, prior to completing the transaction, between producer 15 and elevator operator 20, Net Market 45 again communicates with commodities exchange 25 either via a futures commission merchant 65 or an automated commission system 70.

At Step 300, Net Market 45 attempts to sell a futures contract through commodities exchange 25 for 500 bushels of yellow corn deliverable in three months time at $2.00 a bushel, because that is the price elevator operator's 20 price was determined from. A futures contract at that exact amount may or may not be obtainable through commodities exchange 25 and this is determined at step 310. Often times, the futures contract may not be obtainable for the exact quantity or price desired, however, it may be very close. Such parameters can be determined in advance by elevator operator 20 so that if a futures contract within a given range is obtainable, it will be acceptable to the elevator operator 20. For example, futures contracts may only be obtainable in predetermined amounts. That is, each contract may require a minimum amount such as 5,000 bushels. If the requested amount does not match a multiple of this minimum, the system will, in most cases, attempt to get as close to the requested amount as possible without exceeding it. For example, if each contract is for 5,000 bushels and the elevator operator wants to hedge 17,000 bushels, the system will sell 3 contracts for 15,000 bushels. The system is capable of placing the remaining 2,000 bushels into an odd lot counter. When the elevator's other orders have accumulated to bring the odd lot counter up to a contract level, a futures contract may be obtained by the system on behalf of multiple elevator sites. Some elevator operators may elect to have the system increase their hedge order rather than short it, if the amounts do not match. Thus, when needing 17,000 bushels with a 5,000 minimum for a contract, the system will actually hedge 20,000 bushels. The choice is made by the elevator operator.

If an acceptable futures contract is obtainable, it is then obtained by Net Market 45 on elevator operator's 20 behalf. At Step 330, Net Market 45 issues a communication to producer 15 that the order has been accepted and at Step 340 a contract is generated. Producer 15 and elevator operator 20 both agree in advance to abide by any contract generated at Step 340. This solidifies the process being handled by Net Market 45 and serves to make the system that much more reliable.

At Step 350, elevator operator's 20 posted bid on customer exchange 60 is modified based upon the contract that was generated at Step 340. Elevator operator 20 had initially indicated that 2,000 bushels of yellow corn deliverable in three months was what was needed. Now that a contract has been generated for 500 bushels of yellow corn, the elevator operator 20 need only receive an additional 1,500 bushels. Thus, this is what is updated and displayed on customer exchange 60. Of course, any pricing data that needs to be updated based on changes on commodities exchange is likewise modified. Net Market 45 can facilitate any necessary or desired contract information for producer 15 and elevator operator 20. That is, if it is decided to have documents signed, they can be generated and provided to the relevant parties. Of course, if acceptable, electronic documents can also be so created and distributed.

The present invention is a system that facilitates the interaction between producers, intermediaries and a commodities exchange. As described, the system functions through known information transactions, occurring between a client terminal and a server system appropriately coupled to the Internet or any other communications network. It is to be understood that propagated signals carry the information necessary to enact the system from the perspective of a given participant. Furthermore, while the present invention has been described with respect to commodities transactions, it is equally applicable to any type of commercial transaction where diverse parties are buying and/or selling products, including but not limited to stocks, bonds or other investment or financial products. The system can also facilitate such transactions for any tangible or intangible product that is to be exchanged. The system has been described as giving certain automated functionality in the representation of the buyer of a commodity or other product. This function can be provided for both the buyer and the seller or either one individually. Finally, terms such as producer and elevator operator have been used to illustrate possible embodiments. It is to be understood that the present invention involves parties who sell and parties who buy and the terminology used to describe these parties in a given context is not meant to be limited. For example, elevator operators could be any merchant or other party that engages in the purchase of tangible or intangible products.

From the foregoing detailed description, it will be evident that there are a number of changes, adaptations and modifications of the present invention which come within the province of those skilled in the art. However, it is intended that all such variations not departing from the spirit of the invention be considered as within the scope of the invention.

What is claimed is:

1. A method for executing a commodities transaction on a net market system, said method comprising:
    (a) receiving on the net market system an offer from a seller to sell a commodity, the offer including an available quantity and an asking price for the commodity;
    (b) receiving on the net market system a plurality of bids from a respective plurality of buyers to buy the commodity, each bid including for each buyer a buyer-specific basis and a desired quantity for the commodity;
    (c) receiving on the net market system an updated exchange price for the commodity from a commodities exchange;
    (d) modifying, by the net market system, each bid in the plurality of bids to include a buyer-specific flat price, wherein the net market system is preprogrammed to automatically calculate the buyer-specific flat price by adding the buyer-specific basis for said each bid to the updated exchange price;
    (e) storing, by the net market system, the offer, the plurality of bids and the updated exchange price in a database associated with the net market system;
    (f) comparing, by the net market system, the buyer-specific flat price in a bid received from a particular buyer to the asking price received from the seller;
    (g) determining, by the net market system, that the buyer-specific flat price in the bid for the particular buyer is not less than the asking price for the seller, and sending, by the net market system, an electronic request on behalf of the particular buyer to sell, through the commodities exchange, a futures contract for the commodity at the updated exchange price; and
    (h) after the futures contract is sold, sending, by the net market system, a communication to the seller indicating that the offer is accepted;
    (i) wherein the net market system is preprogrammed to carry out the above steps (c) through (h) automatically without intervention from the seller or the particular buyer.

2. The method of claim 1, further comprising automatically modifying the database, by the net market system, to reduce the desired quantity for the particular buyer by an amount equal to the available quantity.

3. The method of claim 1, further comprising sending, by the net market system, a second communication to a buyer client terminal controlled by the particular buyer, said second communication indicating that the offer was accepted.

4. The method of claim 1, further comprising:
    (j) generating on the net market system a customer exchange structure for the seller, the customer exchange structure being configured to present to the particular buyer the available quantity and the asking price of the seller; and
    (k) transmitting the customer exchange structure to a buyer client terminal controlled by the particular buyer, said transmitting being carried out automatically by the net market system in response to a request received from said buyer client terminal.

5. The method of claim 4, wherein the customer exchange structure comprises a web page or a portion of a web page.

6. The method of claim 4, further comprising:
(j) receiving on the net market system, from the buyer client terminal, a bid to purchase the commodity from the seller for an alternate buyer-specific flat price;
(k) modifying the database, by the net market system, so that the buyer-specific basis in the bid for the particular buyer is reduced by an amount equal to the difference between the alternate buyer-specific flat price and the buyer-specific flat price for the particular buyer; and
(l) repeating steps (d) through (i).

7. The method of claim 1, further comprising:
(j) generating on the net market system a customer exchange structure for the particular buyer, the customer exchange structure being configured to present to the seller the buyer-specific flat price for the particular buyer; and
(k) transmitting the customer exchange structure to a seller client terminal controlled by the seller, wherein said transmitting is carried out automatically by the net market system in response to a request received from the seller client terminal.

8. The method of claim 7, wherein the customer exchange structure comprises a web page or a portion of a web page.

9. The method of claim 7, further comprising:
(l) receiving by the net market system an alternate asking price from the seller client terminal;
(m) modifying the database by the net market system so that the asking price in the offer for the seller is set to an amount that is equal to the alternate asking price; and
(n) repeating steps (c) through (i).

10. A computer system for executing a commodities transaction, comprising:
(a) a server;
(b) a database associated with the server; and
(c) an application program running on the server;
(d) wherein the application program is operable with the server to:
  i) receive from a seller client terminal an offer from a seller to sell a commodity, the offer including an available quantity and an asking price for the commodity;
  ii) receive from a plurality of buyer client terminals a respective plurality of bids from a respective plurality of buyers to buy the commodity, each bid including for each buyer a buyer-specific basis and a desired quantity for the commodity;
  iii) receive from a commodities exchange an updated exchange price for the commodity;
  iv) modify each bid in the plurality of bids to include a buyer-specific flat price, wherein the buyer-specific flat price is calculated by adding the buyer-specific basis for said each bid to the updated exchange price;
  v) store the offer, the plurality of bids and the updated exchange price in a database associated with the net market system;
  vi) determine that the buyer-specific flat price in a bid for a particular buyer is not less than the asking price for the seller, and send an electronic request on behalf of the particular buyer to sell, through the commodities exchange, a futures contract for the commodity at the updated exchange price;
  vii) after the futures contract is sold, send a communication to the seller client terminal indicating the offer is accepted; and
  viii) perform steps (iii) through (vii) automatically without intervention from the seller or the particular buyer.

11. The computer system of claim 10, wherein the application program automatically modifies the database to reduce the desired quantity for the particular buyer by an amount equal to the available quantity.

12. The computer system of claim 10, wherein the application program automatically transmits a second communication to the buyer client terminal indicating that the offer was accepted.

13. The computer system of claim 10, wherein the server:
generates a customer exchange structure for the seller, the customer exchange structure being configured to present to the particular buyer the available quantity and the asking price of the seller; and
transmits the customer exchange structure to a buyer client terminal operated by the particular buyer.

14. The computer system of claim 13, wherein the customer exchange structure comprises a web page or a portion of a web page.

15. The computer system of claim 13, wherein the application program:
receives from the buyer client terminal a bid to purchase the commodity from the seller for an alternate buyer-specific price;
modifies the database so that the buyer-specific basis in the bid for the particular buyer is reduced by an amount equal to the difference between the alternate buyer-specific flat price and the buyer-specific flat price for the particular buyer; and
repeats (d)(iv) through (d)(viii).

16. The computer system of claim 10, wherein the server:
generates a customer exchange structure for the particular buyer, the customer exchange structure being configured to present to the seller the buyer-specific flat price for the particular buyer; and
transmits the customer exchange structure to a seller client terminal controlled by the seller.

17. The computer system of claim 16, wherein the customer exchange structure comprises a web page or a portion of a web page.

18. The computer system of claim 16, wherein the application program:
receives an alternate asking price from the seller client terminal controlled by the seller;
modifies the database so that the asking price in the offer for the seller is set to an amount that is equal to the alternate asking price; and
repeats (d)(iii) through (d)(viii).

19. A method for executing a commodities transaction on a net market system, said method comprising:
(a) receiving on the net market system bid information from a plurality of buyers, the bid information including for each buyer in the plurality of buyers a desired commodity, a desired quantity and a buyer-specific basis for the desired commodity;
(b) repetitively receiving on the net market system, from a commodities exchange, an updated exchange price for the desired commodity, and calculating by the net market system, for each buyer in the plurality of buyers, a buyer-specific flat price for the desired commodity based on the buyer-specific basis for said each buyer and said updated exchange price;
(c) storing the bid information on the net market system;
(d) generating on the net market system a web page for a particular buyer in the plurality of buyers, the web page being configured to present to a seller the desired commodity, the desired quantity and the buyer-specific flat price for said particular buyer and to receive from the seller an offer to sell an available quantity of the desired commodity to the particular buyer for an asking price;

(e) transmitting the web page, by the net market system, to a seller client terminal controlled by the seller;

(f) receiving, by the net market system, the offer from the seller client terminal, wherein said offer is entered by the seller via the web page;

(g) determining, by the net market system, that the buyer-specific flat price for said particular buyer is not less than the asking price, and generating, by the net market system, a request to sell a futures contract for the desired commodity through the commodities exchange on behalf of said particular buyer; and (h) after the futures contract is sold, electronically transmitting to the seller client terminal, by the net market system, a communication indicating that the offer is accepted;

(i) wherein steps (b) through (h) are carried out automatically by the net market system without intervention from said particular buyer.

20. The method of claim 19, further comprising transmitting, by the net market system, a communication to the seller to inform the seller that the offer has been accepted.

21. The method of claim 19, further comprising transmitting, by the net market system, a communication to the particular buyer to inform the particular buyer that the offer has been accepted.

22. The method of claim 19, further comprising:
(j) receiving on the net market system a notification indicating that the futures contract has not sold; and
(k) transmitting, by the net market system, a communication to the seller client terminal indicating that the offer is rejected.

23. The method of claim 19, further comprising periodically generating, by the net market system, a new request to sell the futures contract for the desired commodity on behalf of said particular buyer.

24. The method of claim 19, further comprising automatically modifying, by the net market system, the bid information stored on the net market system to reduce the desired quantity by an amount equal to the available quantity when the communication indicating the offer is accepted is transmitted.

25. A method for executing a commodities transaction on a net market system, comprising:
receiving on the net market system from a seller client terminal an offer from a seller to sell a commodity, the offer including an available quantity and an asking price for the commodity;
receiving on the net market system from a plurality of buyer client terminals a respective plurality of bids from a respective plurality of buyers to buy the commodity, each bid including for each buyer a buyer-specific basis and a desired quantity for the commodity; and
until (1) the net market system receives a request from the seller client terminal indicating the offer is canceled, or (2) the net market system sends a communication to the seller client terminal indicating that the offer is accepted, iteratively performing the following steps (a) through (e) on the net market system without intervention from the seller:
(a) receiving on the net market system, from a commodities exchange, an updated exchange price for the commodity;
(b) modifying, by the net market system, each bid in the plurality of bids to include a buyer-specific flat price, wherein the buyer-specific flat price is calculated by the net market system by adding the buyer-specific basis for said each bid to the updated exchange price;

(c) storing, by the net market system, the offer, the plurality of bids and the updated exchange price in a database associated with the net market system;
(d) determining, by the net market system, that the buyer-specific flat price in a bid for a particular buyer is not less than the asking price for the seller, and sending, by the net market system, a request on behalf of the particular buyer to sell, through the commodities exchange, a futures contract for the commodity at the updated exchange price; and
(e) after the futures contract is sold, sending, by the net market system, a communication to the seller client terminal indicating that the offer is accepted.

26. The method of claim 25, further comprising modifying the database, by the net market system, to reduce the desired quantity for the particular buyer by an amount equal to the available quantity.

27. The method of claim 25, further comprising transmitting, by the net market system, a communication to the buyer client terminal to inform the particular buyer that the offer is accepted.

28. A computer system for executing a commodities transaction, comprising:
a server;
a database associated with the server;
an application program running on the server;
wherein the application program is operable with the server to:
receive from a seller client terminal an offer from a seller to sell a commodity, the offer including an available quantity and an asking price for the commodity;
receive from a plurality of buyer client terminals a respective plurality of bids from a respective plurality of buyers to buy the commodity, each bid including for each buyer a buyer-specific basis and a desired quantity for the commodity; and
carry out steps (a) through (e) below without intervention from the seller
(a) receive from a commodities exchange an updated exchange price for the commodity,
(b) modify each bid in the plurality of bids to include a buyer-specific flat price, wherein the buyer-specific flat price is calculated by adding the buyer-specific basis for said each bid to the updated exchange price,
(c) store the offer, the plurality of bids and the updated exchange price in a database associated with the net market system,
(d) determine that the buyer-specific flat price in a bid for a particular buyer is not less than the asking price for the seller, and send a request on behalf of the particular buyer to sell, through the commodities exchange, a futures contract for the commodity at the updated exchange price, and
(e) after the futures contract is sold, send a communication to the seller client terminal that the offer is accepted.

29. The computer system of claim 28, wherein the application program automatically modifies the database to reduce the desired quantity for the particular buyer by an amount equal to the available quantity.

30. The computer system of claim 28, wherein the application program transmits a communication to the buyer client terminal to inform the particular buyer that the offer is accepted.

31. A method for executing a commodities transaction on a net market system, comprising:

receiving on the net market system a bid from a buyer to buy a commodity, the bid including a buyer-specific basis and a desired quantity for the commodity; and performing, by the net market system, the following steps (a) through (f) without intervention from the buyer:

(a) receiving, by the net market system, from a commodities exchange, an updated exchange price for the commodity, (b) modifying the bid, by the net market system, to include in the bid a buyer-specific flat price, wherein the buyer-specific flat price is calculated by the net market system by adding the buyer-specific basis to the updated exchange price, (c) receiving, by the net market system, from a plurality of seller client terminals, a plurality of offers from a plurality of sellers to sell the commodity, each offer including an available quantity and an asking price for the commodity, (d) storing, by the net market system, the bid, the plurality of offers and the updated exchange price in a database associated with the net market system, (e) determining, by the net market system, that the asking price in a particular offer for a particular seller is not greater than the buyer-specific flat price in the bid for the buyer, and sending, by the net market system, a request on behalf of the buyer to sell, through the commodities exchange, a futures contract for the commodity at the updated exchange price, and (f) automatically accepting, by the net market system, the particular offer after the futures contract is sold.

32. The method of claim 31, further comprising modifying the database, by the net market system, to reduce the desired quantity for the particular buyer by an amount equal to the available quantity.

33. The method of claim 31, further comprising transmitting, by the net market system, a communication to a seller client terminal controlled by particular seller to inform the particular seller that the particular offer is accepted.

34. The method of claim 31, further comprising transmitting, by the net market system, a communication to the buyer client terminal to inform the buyer that the particular offer is accepted.

35. A computer system for executing a commodities transaction, comprising:
a server;
a database associated with the server; and
an application program running on the server;

wherein the application program is operable with the server to (a) receive from a buyer client terminal a bid from a buyer to buy a commodity, the bid including a buyer-specific basis and a desired quantity for the commodity, and (b) while the bid is not canceled by the buyer and no contract is generated based on the bid, iteratively perform (i) through (vi) without intervention from the buyer:

i) receive from a commodities exchange an updated exchange price for the commodity, ii) modify the bid to include a buyer-specific flat price, wherein the buyer-specific flat price is calculated by adding the buyer-specific basis to the updated exchange price;

iii) receive from a seller client terminal an offer from a seller to sell the commodity, the offer including an available quantity and an asking price for the commodity, iv) store the bid, the offer and the updated exchange price in a database associated with the net market system, v) determine that the asking price in the offer for the seller is not greater than the buyer-specific flat price in the bid for the buyer, and attempt on behalf of the buyer to sell, through the commodities exchange, a futures contract for the commodity at the updated exchange price, and vi) after the attempt to sell the futures contract succeeds, generate a contract between the buyer and the seller, whereby the buyer is obligated to buy the available quantity of the commodity from the seller for the asking price.

36. The computer system of claim 35, wherein the application program automatically reduces the desired quantity for the particular buyer by an amount equal to the available quantity.

37. The computer system of claim 35, wherein the application program automatically transmits a communication to the seller client terminal to inform the seller that the contract between the buyer and the seller has been generated.

38. The computer system of claim 35, wherein the application program automatically transmits a communication to the buyer client terminal to inform the buyer that the contract between the buyer and the seller has been generated.

* * * * *